(12) United States Patent
Zhao et al.

(10) Patent No.: US 12,047,294 B2
(45) Date of Patent: Jul. 23, 2024

(54) PACKET SENDING METHOD, APPARATUS, AND SYSTEM, AND STORAGE MEDIUM

(71) Applicant: Huawei Technologies Co., Ltd., Shenzhen (CN)

(72) Inventors: Mengkai Zhao, Beijing (CN); Guoqi Xu, Beijing (CN); Juan Zheng, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/363,783

(22) Filed: Aug. 2, 2023

(65) Prior Publication Data

US 2023/0388232 A1    Nov. 30, 2023

Related U.S. Application Data

(63) Continuation of application No. PCT/CN2022/073045, filed on Jan. 20, 2022.

(30) Foreign Application Priority Data

Feb. 3, 2021    (CN) .......................... 202110151946.8

(51) Int. Cl.
| | | |
|---|---|---|
| G06F 15/16 | (2006.01) | |
| H04L 45/00 | (2022.01) | |
| H04L 45/02 | (2022.01) | |
| H04L 45/748 | (2022.01) | |

(52) U.S. Cl.
CPC ............ *H04L 45/748* (2013.01); *H04L 45/02* (2013.01); *H04L 45/566* (2013.01)

(58) Field of Classification Search
CPC ...... H04L 45/748; H04L 45/02; H04L 45/566
USPC ........................................................ 709/238
See application file for complete search history.

(56) References Cited

U.S. PATENT DOCUMENTS

| | | | |
|---|---|---|---|
| 7,746,865 B2 * | 6/2010 | Shankara | H04L 45/00 709/245 |
| 9,882,872 B2 * | 1/2018 | You | H04L 61/5007 |
| 10,601,724 B1 * | 3/2020 | Filsfils | H04L 47/70 |
| 11,627,094 B2 * | 4/2023 | Filsfils | H04L 43/0888 370/235 |

(Continued)

OTHER PUBLICATIONS

K. Talaulikar et al., Flexible Algorithm Definition Advertisement with BGP Link-State, draft-ietf-idr-bgp-ls-flex-algo-01, Inter-Domain Routing, Internet-Draft, Jul. 8, 2019, 13 pages.

*Primary Examiner* — Alicia Baturay
(74) *Attorney, Agent, or Firm* — Slater Matsil, LLP

(57) ABSTRACT

This application discloses a packet sending method, apparatus, and system, and a storage medium, and relates to the communication field. The method includes: A first device receives a first packet, where the first packet includes a first address prefix, the first device is a border device in a first AS domain, the first address prefix is obtained based on an address prefix advertised by a second device, the second device is located in a second AS domain, the first AS domain is different from the second AS domain, and the first address prefix is used to send a packet to the second device. The first device obtains a second address prefix and identification information of a target flexible algorithm based on the first address prefix, where the second address prefix is used to send a packet to the second device.

20 Claims, 6 Drawing Sheets

(56) References Cited

U.S. PATENT DOCUMENTS

| | | | |
|---|---|---|---|
| 11,909,622 B1* | 2/2024 | Yadav | H04L 45/22 |
| 2016/0043940 A1* | 2/2016 | Mahadevan | H04L 45/566 |
| | | | 709/223 |
| 2021/0377155 A1* | 12/2021 | Chen | H04L 45/02 |
| 2023/0092549 A1* | 3/2023 | Chen | H04L 45/04 |
| | | | 370/392 |
| 2023/0117035 A1* | 4/2023 | Wu | H04L 45/748 |
| | | | 709/238 |
| 2023/0155937 A1* | 5/2023 | Hu | H04L 45/04 |
| | | | 370/254 |
| 2023/0283568 A1* | 9/2023 | Filsfils | H04L 43/0888 |
| | | | 370/235 |
| 2024/0022508 A1* | 1/2024 | Duan | H04L 45/741 |

\* cited by examiner

PACKET SENDING METHOD, APPARATUS, AND SYSTEM, AND STORAGE MEDIUM

CROSS-REFERENCE TO RELATED APPLICATIONS

This application is a continuation of International Application No. PCT/CN2022/073045, filed on Jan. 20, 2022, which claims priority to Chinese Patent Application No. 202110151946.8, filed on Feb. 3, 2021. The disclosures of the aforementioned applications are hereby incorporated by reference in their entireties.

TECHNICAL FIELD

This application relates to the communication field, and in particular, to a packet sending method, apparatus, and system, and a storage medium.

BACKGROUND

In a flexible algorithm, a segment routing (SR) network is segmented into network slices through algorithm definition. Each network slice is a logical network, and different network slices correspond to different flexible algorithms.

A device in the SR network is referred to as a first device, and the first device needs to advertise identification information of the flexible algorithm to a second device. The second device is a device other than the first device in the SR network, and the first device and the second device are located in a same autonomous system (AS) domain. In this way, when the second device sends a service to the first device, the second device calculates, based on the flexible algorithm corresponding to the identification information, a forwarding path that arrives at the first device. The forwarding path is located in a network slice corresponding to the flexible algorithm, and the service is sent to the first device through the forwarding path. This implements flexible network deployment.

However, when the first device and the second device are located in different AS domains, the second device cannot receive the identification information of the flexible algorithm that is advertised by the first device, and consequently the second device cannot send the service to the first device by using the flexible algorithm, affecting flexibility of network deployment.

SUMMARY

This application provides a packet sending method, apparatus, and system, and a storage medium, to improve flexibility of network deployment. The technical solutions are as follows:

According to a first aspect, this application provides a packet sending method. In the method, a first device receives a first packet, where the first packet includes a first address prefix, the first device is a border device in a first autonomous system AS domain, the first address prefix is obtained based on an address prefix advertised by a second device, the second device is located in a second AS domain, the first AS domain is different from the second AS domain, and the first address prefix is used to send a packet to the second device. The first device obtains a second address prefix and identification information of a target flexible algorithm based on the first address prefix, where the second address prefix is used to send a packet to the second device. The first device sends a second packet to a device in the first AS domain, where the second packet includes the second address prefix and the identification information of the target flexible algorithm, so that the device in the first AS domain forwards, through a path corresponding to the target flexible algorithm, a packet that matches the second address prefix.

The first device obtains the second address prefix and the identification information of the target flexible algorithm based on the first address prefix in the first packet. In this way, the first device sends the second address prefix and the identification information of the target flexible algorithm to the device in the first AS domain, and the second address prefix is used to send the packet to the second device, so that the device in the first AS domain may also obtain a target flexible algorithm corresponding to a device in the second AS domain. In this way, when the device in the first AS domain needs to send the packet that matches the second address prefix, the device may send the packet by using the path corresponding to the target flexible algorithm. This improves flexibility of network deployment.

In a possible implementation, the first device determines a first correspondence based on the first address prefix, where the first correspondence includes a correspondence between the second address prefix and identification information of a first candidate flexible algorithm. The first device includes the correspondence between the second address prefix and the identification information of the first candidate flexible algorithm. In this way, the first correspondence may be determined based on the first address prefix, to determine the target flexible algorithm, and ensure that the first device may send the identification information of the target flexible algorithm to the device in the first AS domain.

In another possible implementation, the first device uses the first candidate flexible algorithm as the target flexible algorithm. In this implementation, the first device may use the first candidate flexible algorithm in the first correspondence as the target flexible algorithm, to be specific, the target flexible algorithm in the first AS domain is obtained through a statically configured correspondence.

In another possible implementation, the first packet further includes identification information of a second candidate flexible algorithm. The first device determines the target flexible algorithm from the first candidate flexible algorithm and the second candidate flexible algorithm. In other words, the first device may further receive a second candidate flexible algorithm from the second AS domain, and determine the target flexible algorithm from the second candidate flexible algorithm and the first candidate flexible algorithm. In this implementation, the target flexible algorithm in the first AS domain may be obtained through the statically configured correspondence, or may be dynamically carried in the packet from the second AS domain. This increases diversity of manners of obtaining the target flexible algorithm.

In another possible implementation, the second address prefix is a prefix in a segment routing internet protocol version 6 locator SRv6 locator, the second packet includes a locator type-length-value locator TLV, and the locator TLV includes the second address prefix and the identification information of the target flexible algorithm. In this implementation, the second packet includes the locator TLV, and is used to advertise the SRv6 locator to the device in the first AS domain, and carry a target flexible algorithm corresponding to the SRv6 locator.

In another possible implementation, the identification information of the second candidate flexible algorithm is carried in a type-length-value TLV of the first packet, and a path corresponding to the second candidate flexible algorithm is used to send a packet to the second device in the second AS domain. In this way, in an inter-domain scenario, to be specific, a border device in the second AS domain may also send the identification information of the second candidate flexible algorithm to the first device in the first AS domain through the TLV in the first packet, to ensure that the first device may obtain the target flexible algorithm.

In another possible implementation, the first address prefix matches the second address prefix. Therefore, that the first device obtains the second address prefix and the identification information of the target flexible algorithm based on the first address prefix means that the first device matches, based on the first address prefix, the first correspondence including the second address prefix, and then obtains the second address prefix and the identification information of the target flexible algorithm based on the first correspondence.

In another possible implementation, the first packet is a border gateway protocol BGP packet. The BGP packet is used to send, from the second AS domain to the first AS domain, routing information that includes the first address prefix.

According to a second aspect, this application provides a packet sending method. In the method, a third device sends a first packet to a device in a first AS domain, where the first packet includes a first address prefix and identification information of a flexible algorithm, so that the device in the first AS domain forwards a packet through a path corresponding to the flexible algorithm, and the packet matches the first address prefix. The third device is a border device in a second AS domain, the first AS domain is different from the second AS domain, the first address prefix identifies a second device in the second AS domain, and a packet forwarding path corresponding to the flexible algorithm is used to forward a packet to the second device in the second AS domain.

The first packet sent by the third device to the device in the first AS domain includes the identification information of the flexible algorithm. In this way, it is ensured that the first device may obtain a target flexible algorithm corresponding to the second device in the second AS domain, and send identification information of the target flexible algorithm to the device in the first AS domain, where the first device is a border device in the first AS domain. In this way, when the device in the first AS domain needs to send a packet to the second device in the second AS domain, the device may send the packet by using a path corresponding to the target flexible algorithm. This improves flexibility of network deployment.

In a possible implementation, the third device receives a third packet, where the third packet includes an address prefix advertised by the second device and the identification information of the flexible algorithm, the first address prefix is obtained based on the address prefix advertised by the second device, and the second device is a device other than the third device in the second AS domain. In this way, for the border device in the second AS domain, to be specific, for the third device, when receiving the address prefix advertised by the second device and the identification information of the flexible algorithm, the third device may send, to the first AS domain, the address prefix of the second device and the identification information of the flexible algorithm that identify the second device, to resolve a problem that the identification information of the flexible algorithm is lost in an inter-domain scenario. In this way, it is ensured that the first device may obtain the target flexible algorithm corresponding to the second device, and send the identification information of the target flexible algorithm to the device in the first AS domain. In this way, when the device in the first AS domain needs to send a packet to the second device, the device may send the packet by using the path corresponding to the target flexible algorithm. This improves flexibility of network deployment.

In a possible implementation, the first packet is a border gateway protocol BGP packet. The BGP packet is used to send, from the second AS domain to the first AS domain, routing information that includes the first address prefix.

In another possible implementation, the address prefix advertised by the second device is different from the first address prefix. In this way, the third device may aggregate the address prefix advertised by the second device to obtain the first address prefix, so that the first address prefix identifies different devices in the second AS domain, and the device in the first AS domain sends packets to different devices in the second AS domain by using the path corresponding to the target flexible algorithm. This further improves flexibility of network deployment.

In another possible implementation, the second device is the same as the third device. In this way, the first address prefix also identifies the third device, and the device in the first AS domain obtains a target flexible algorithm corresponding to the third device, and sends a packet to the third device by using the path corresponding to the target flexible algorithm, to improve the flexibility of the network deployment.

In another possible implementation, the identification information of the flexible algorithm is carried in a type-length-value TLV of the first packet. In this way, in an inter-domain scenario, to be specific, a third device in the second AS domain may also send, to the device in the first AS domain through the TLV in the first packet, the identification information of the flexible algorithm advertised by the device in the second AS domain, to ensure that the device in the first AS domain may obtain the flexible algorithm.

In another possible implementation, the third packet includes a locator type-length-value locator TLV, and the locator TLV includes an address prefix advertised by the device in the second AS domain and the identification information of the flexible algorithm. In other words, the third packet is a packet for advertising an SRv6 locator in the second AS domain.

According to a third aspect, this application provides a packet sending apparatus, configured to perform the method in the first aspect or any possible implementation in the first aspect. Specifically, the apparatus includes units configured to perform the method in the first aspect or any possible implementation in the first aspect.

According to a fourth aspect, this application provides a packet sending apparatus, configured to perform the method in the second aspect or any possible implementation in the second aspect. Specifically, the apparatus includes units configured to perform the method in the second aspect or any possible implementation in the second aspect.

According to a fifth aspect, this application provides a packet sending apparatus, where the apparatus includes a processor and a memory. The processor and the memory may be connected through an internal connection. The memory is configured to store a program, and the processor is configured to execute the program in the memory, so that the device completes the method in the first aspect or any possible implementation in the first aspect.

According to a sixth aspect, this application provides a packet sending apparatus, where the apparatus includes a processor and a memory. The processor and the memory may be connected through an internal connection. The memory is configured to store a program, and the processor is configured to execute the program in the memory, so that the device completes the method in the second aspect or any possible implementation in the second aspect.

According to a tenth aspect, this application provides a computer program product. The computer program product includes a computer program stored in a computer-readable storage medium, and the computer program is loaded by a processor to implement the method according to the first aspect, the second aspect, any possible implementation in the first aspect, or any possible implementation in the second aspect.

According to an eighth aspect, this application provides a computer-readable storage medium, configured to store a computer program, where the computer program is loaded by a processor to perform the method in the first aspect, the second aspect, any possible implementation in the first aspect, or any possible implementation in the second aspect.

According to a ninth aspect, this application provides a chip, including a memory and a processor. The memory is configured to store computer instructions, and the processor is configured to invoke the computer instructions from the memory and run the computer instructions, to perform the method in the first aspect, the second aspect, any possible implementation in the first aspect, or any possible implementation in the second aspect.

According to a tenth aspect, this application provides a packet sending system. The system includes the apparatus in the third aspect and the apparatus in the fourth aspect, or the system includes the apparatus in the fifth aspect and the apparatus in the sixth aspect.

DETAILED DESCRIPTION OF ILLUSTRATIVE EMBODIMENTS

The following further describes in detail embodiments of this application with reference to accompanying drawings.

Figure 1:
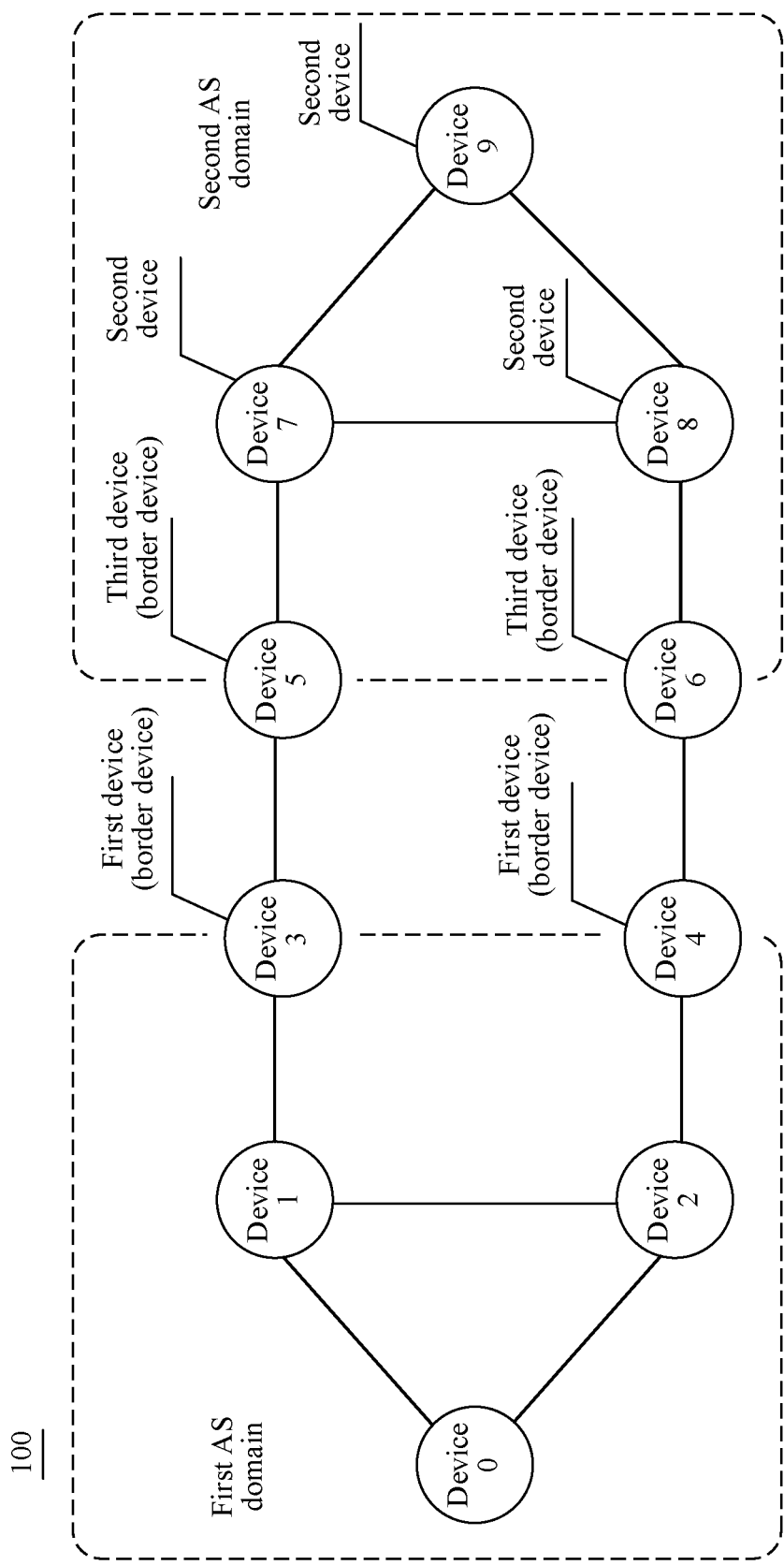
FIG. 1 is a schematic diagram of a structure of an SR network according to an embodiment of this application.

Referring to FIG. 1, embodiments of this application provide an SR network 100, including:

a first AS domain and a second AS domain, where the first AS domain includes a plurality of devices, and the second AS domain includes a plurality of devices. A plurality of devices in the first AS domain may communicate with each other, and a plurality of devices in the second AS domain may communicate with each other. A border device in the first AS domain may communicate with a border device in the second AS domain.

For example, as shown in FIG. 1, the first AS domain includes a device 0, a device 1, a device 2, a device 3, and a device 4. The device 0 may separately communicate with the device 1 and the device 2, the device 1 may further separately communicate with the device 2 and the device 3, the device 2 may further communicate with the device 4, and the device 3 and the device 4 are border devices in the first AS domain.

The second AS domain includes a device 5, a device 6, a device 7, a device 8, and a device 9. The device 9 may separately communicate with the device 7 and the device 8. The device 7 may further separately communicate with the device 5 and the device 8. The device 8 may further communicate with the device 6. The device 5 and the device 6 are border devices in the second AS domain. The device 5 may further communicate with the device 3, and the device 6 may further communicate with the device 4.

The foregoing uses an example in which the SR network 100 includes the first AS domain and the second AS domain for description. For any one of the first AS domain and the second AS domain, a structure such as a quantity of devices and/or a connection relationship in the AS domain is also used as an example for description, and cannot be used as a limitation on the SR network 100 and the AS domain. Certainly, based on an actual requirement, the AS domain may further have another structure, and the SR network 100 may further include other AS domains, to be specific, the SR network 100 may further include a third AS domain, a fourth AS domain, and/or the like. Structures of the other AS domains are not described herein one by one.

For each AS domain, a plurality of flexible algorithms are deployed in the AS domain, and a plurality of network topologies are generated in the AS domain through the plurality of flexible algorithms. Each network topology is a logical network, and includes some devices and/or some links in the AS domain. Each network topology corresponds to a different flexible algorithm. For the flexible algorithm corresponding to each network topology, the flexible algorithm may be used to calculate a path used to forward a packet, and the path is located in the network topology.

For the second AS domain, the second device sends an intermediate system to intermediate system (ISIS) packet to another device in the second AS domain, so that the another device generates a forwarding entry, where the forwarding entry is used to send a packet to the second device, and the second device is a device in the second AS domain. The ISIS packet includes an SR internet protocol version 6 (SRv6) locator of the second device, and the SRv6 locator includes an address prefix, a mask, and identification information of a flexible algorithm that are advertised by the second device. The device in the second AS domain receives the ISIS packet, generates the forwarding entry based on the SRv6 locator, and continues to transfer the ISIS packet to another device in the second AS domain. The forwarding entry includes the address prefix, the mask, and next-hop information, and the next-hop information is obtained based on the flexible algorithm. The next-hop information includes an interface identifier of an outbound interface on the device, and another device communicating with the outbound interface is located in a network topology corresponding to the flexible algorithm. In this way, all devices that receive the ISIS packet in the second AS domain may generate the forwarding entry in the foregoing manner, and the next-hop information in the forwarding entry is obtained based on the flexible algorithm, to form a path corresponding to the flexible algorithm in the second AS domain, and the path is located in the network topology corresponding to the flexible algorithm.

For a device in the second AS domain, when the device needs to send a packet to the second device, the device performs an AND operation on a destination address of the packet and a mask included in the forwarding entry, to obtain an address prefix; and when the obtained address prefix matches the address prefix included in the forwarding entry, to be specific, when the packet matches the address prefix included in the forwarding entry, the device sends the packet to the second device based on the next-hop information included in the forwarding entry. In other words, the packet is sent to the second device through the path corresponding to the flexible algorithm, and the path corresponding to the flexible algorithm is located in the network topology corresponding to the flexible algorithm. In this way, the packet is sent to the second device through the network topology corresponding to the flexible algorithm. This improves flexibility of network deployment.

For example, the first AS domain and the second AS domain shown in FIG. 1 are used as an example. It is assumed that a flexible algorithm 1 corresponding to identification information "130" and a flexible algorithm 2 corresponding to identification information "128" are deployed in the first AS domain, and a first network topology and a second network topology are generated in the first AS domain through the flexible algorithm 1 and the flexible algorithm 2. The first network topology includes the device 0, the device 1, and the device 3, and the second network topology includes the device 0, the device 2, and the device 4. The first network topology corresponds to the flexible algorithm 1, and the second network topology corresponds to the flexible algorithm 2. In addition, it is assumed that a flexible algorithm 3 corresponding to identification information "129" is deployed in the second AS domain, and a third network topology is generated in the second AS domain through the flexible algorithm 3. The third network topology includes the device 5, the device 6, the device 7, the device 8, and the device 9.

It is assumed that the device 9 in the second AS domain sends the ISIS packet, the ISIS packet includes an SRv6 locator of the device 9. The SRv6 locator includes an address prefix, a mask, and the identification information "129" of the flexible algorithm 3 that are advertised by the device 9. When receiving the ISIS packet, the device 7 in the second AS domain generates the forwarding entry based on an SRv6 locator included in the ISIS packet. The forwarding entry includes the address prefix, the mask, and the next-hop information. The next-hop information is obtained based on the flexible algorithm 3. The next-hop information includes an interface identifier of an outbound interface that is on the device 7 and that communicates with the device 9. The device 7 sends the ISIS packet to another device in the second AS domain, for example, sends the ISIS packet to the device 5 and the device 8. When receiving the ISIS packet, the device 5, the device 8, and the device 6 in the second AS domain perform an operation performed by the device 9.

For the border device in the second AS domain, namely, for the third device, the third device receives the ISIS packet, and sends a BGP packet to another AS domain communicating with the third device, so that a border device in the another AS domain generates a forwarding entry based on the BGP packet. The forwarding entry is used to send a packet to the second device, the BGP packet includes a first address prefix and a mask corresponding to the first address prefix, and the first address prefix included in the BGP packet is obtained based on the address prefix advertised by the second device. It is assumed that the another AS domain is the first AS domain, and a border device that is in the first AS domain and that communicates with the third device is the first device. The first device receives the BGP packet, and then sends the ISIS packet to the device in the first AS domain. The ISIS packet includes the first address prefix in the BGP packet and the mask corresponding to the first address prefix. The device in the first AS domain generates the forwarding entry based on the ISIS packet. The forwarding entry includes the first address prefix, the mask corresponding to the first address prefix, and the next-hop information. The next-hop information is obtained based on the network topology in the first AS domain.

However, based on a stipulation of an existing communication protocol, the BGP packet cannot carry the identification information of the flexible algorithm. In an inter-domain scenario, when the third device sends the BGP packet to the first AS domain, the identification information of the flexible algorithm advertised by the device in the second AS domain is lost. As a result, the device in the first AS domain cannot obtain the identification information of the flexible algorithm. In this way, the device in the first AS domain cannot send a packet to the device in the second AS domain by using the flexible algorithm. This affects flexibility of network deployment.

For example, for a border device 5 and a border device 6 in the second AS domain, the border device 5 receives the ISIS packet, and sends a BGP packet to the first AS domain that communicating with the border device 5. The BGP packet includes the first address prefix and the mask corresponding to the first address prefix, and the first address prefix included in the BGP is obtained based on an address prefix advertised by the device 9. The border device 3 in the first AS domain receives the BGP packet, and sends the ISIS packet to the device 1, the device 2, and the device 0 in the first AS domain. The ISIS packet includes the first address prefix in the BGP packet and the mask corresponding to the first address prefix. Similarly, the border device 6 receives the ISIS packet, and sends the BGP packet to the first AS domain communicating with the border device 6. The BGP packet also includes the first address prefix and the mask corresponding to the first address prefix. The border device 4 in the first AS domain receives the BGP packet, and sends the ISIS packet to the device 1, the device 2, and the device 0 in the first AS domain. The ISIS packet includes the first address prefix in the BGP packet and the mask corresponding to the first address prefix.

It may be learned from the foregoing content that both the border device 5 and the border device 6 lose the identification information of the flexible algorithm advertised by the device 9 in the BGP packet sent to the first AS domain. The foregoing uses a direction in which the second AS domain sends the address prefix to the first AS domain as an example for description. Similarly, the first AS domain may also send the address prefix to the second AS domain based on the foregoing described content, and the BGP packet sent by the first AS domain to the second AS domain also loses the identification information of the flexible algorithm advertised by the device in the first AS domain.

To resolve the foregoing problem and improve flexibility of network deployment, in this application, any one of the following embodiments may be used to resolve a problem that identification information of the flexible algorithm is lost in the inter-domain scenario, so that the device in the first AS domain may also obtain the identification information of the flexible algorithm. Therefore, when the device in the first AS domain needs to send a packet to the device in the second AS domain, a forwarding path that arrives the device in the first AS domain may be calculated by using the flexible algorithm, and the packet is sent by using the forwarding path.

Figure 2:
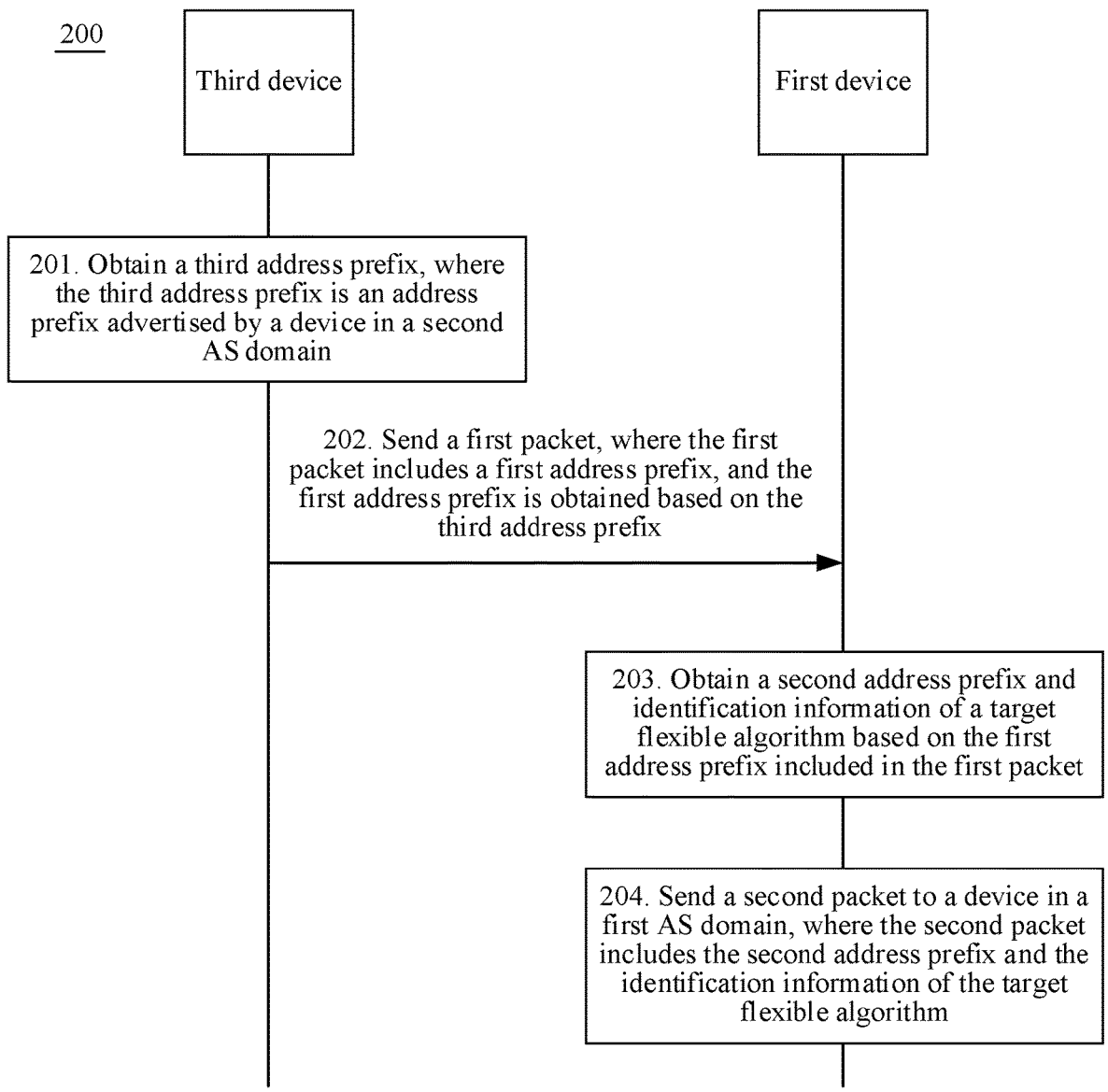
FIG. 2 is a flowchart of a packet sending method according to an embodiment of this application.

Referring to FIG. 2, embodiments of this application provide a packet sending method 200. The method 200 may be applied to the SR network 100 shown in FIG. 1. In the method 200, a first packet sent by a third device to a first device does not include identification information of a flexible algorithm advertised by a device in a second AS domain, but the first device actively obtains identification information of a target flexible algorithm after receiving the first packet. For example, the SR network 100 shown in FIG. 1 is used as an example. The third device may be a device 6, and the first device may be a device 4. A first packet sent by the device 6 to the device 4 does not include the identification information of the flexible algorithm advertised by the device in the second AS domain, but the device 4 actively obtains the identification information of the target flexible algorithm after receiving the first packet. The method 200 includes the following steps.

Step 201. A third device obtains a third address prefix, where the third device is a border device in a second AS domain, and the third address prefix is an address prefix advertised by a device in the second AS domain.

The third address prefix may be an address prefix of the third device (for example, an address prefix advertised by the third device), or may be an address prefix advertised by a second device. The second device is a device other than the third device in the second AS domain.

In step 201, when the third address prefix is the address prefix advertised by the second device, the third device receives a third packet. The third packet includes the third address prefix advertised by the second device, and obtains the third address prefix from the third packet. The third packet may be a packet sent by the second device in the second AS domain.

For example, the second AS domain in the SR network 100 shown in FIG. 1 is used as an example. The third device may be a device 5 or the device 6 in the SR network 100 shown in FIG. 1. It is assumed that the third device is the device 6, and the second device is another device other than the device 6 in the second AS. In other words, the second device includes the device 5, a device 7, a device 8, and/or a device 9. It is assumed that the second device is the device 9. The device 9 sends the third packet in the second AS domain. The third packet includes a third address prefix advertised by the device 9. The device 6 receives the third packet, and obtains the third address prefix from the third packet.

The third packet may further include a second mask and/or identification information of a second candidate flexible algorithm. The second mask is a mask advertised by the second device, and the identification information of the second candidate flexible algorithm is the identification information of the flexible algorithm advertised by the second device.

The third address prefix may be an internet protocol version 6 (IPv6) address of the second device, or may be an address prefix included in an SRv6 locator of the second device.

The SRv6 locator of the second device includes the third address prefix, the second mask, and the identification information of the second candidate flexible algorithm.

Optionally, when the third address prefix is the IPv6 address of the second device, the third packet includes an IPv6 prefix reachability TLV, and the IPv6 prefix reachability TLV includes the third address prefix. When receiving the third packet, the third device obtains the third address prefix from the IPv6 prefix reachability TLV of the third packet.

Optionally, the IPv6 prefix reachability TLV further includes the second mask.

For example, it is assumed that the third address prefix is "9:100::1", "9:100::1" is an IPv6 address on the second device, and it is assumed that the second mask on the second device is "/64", a length of the mask is 128 bits, high-order 64 bit values of the mask are all 1, and low-order 64 bit values of the mask are all 0. The IPv6 prefix reachability TLV of the third packet includes the third address prefix and the second mask. The third address prefix and the second mask are represented as "9:100::1/64", to be specific, the IPv6 prefix reachability TLV of the third packet includes "9:100::1/64". When receiving the third packet, the third device obtains the third address prefix "9:100::1" from the IPv6 prefix reachability TLV of the third packet.

Optionally, when the third address prefix is an address prefix included in the SRv6 locator of the second device, the third packet includes a locator type-length-value (Locator TLV), the locator TLV includes the SRv6 locator of the second device, and the SRv6 locator includes the third address prefix, the second mask, and the identification information of the second candidate flexible algorithm. When receiving the third packet, the third device obtains the third address prefix from the SRv6 locator included in the third packet.

For example, it is assumed that the SRv6 locator of the second device includes "9:100::/64" and "129". "9:100::" is the address prefix included in the SRv6 locator, and "/64" is the mask. A length of the mask is 128 bits, the high-order 64 bit values of the mask are all 1, and the low-order 64 bit values of the mask are all 0. "129" is the identification information of the second candidate flexible algorithm. In the example, the third address prefix and the mask that are advertised by the second device are represented as "9:100::/64". The identification information of the second candidate flexible algorithm that is advertised by the second device is "129", and the locator TLV of the third packet includes the SRv6 locator, to be specific, includes "9:100::/64" and "129". When receiving the third packet, the third device obtains the third address prefix "9:100::" from the SRv6 locator included in the third packet.

For the third packet, the second device sends the third packet to the device that is in the second AS domain and that communicates with the second device. For each device communicating with the second device, the device receives the third packet. When the third packet includes an IPv6 prefix reachability TLV, the IPv6 prefix reachability TLV includes the third address prefix and the second mask, and the third address prefix is the IPv6 address of the second device, and generates a forwarding entry based on the third address prefix and the second mask. The forwarding entry includes the third address prefix, the second mask, and next-hop information, and the next-hop information is obtained based on a topology in the second AS domain. Alternatively, when the third packet includes the SRv6 locator, the SRv6 locator includes the third address prefix, the second mask, and the identification information of the second candidate flexible algorithm, and generates a forwarding entry based on the SRv6 locator. The forwarding entry includes the third address prefix, the second mask, and next-hop information, and the next-hop information is obtained based on the second candidate flexible algorithm. The device may further continue to forward the third packet to another device in the second AS domain. When the device is a border device in the second AS domain, to be specific, the device is the third device, the following operation in step 201 is performed.

For example, the SR network 100 shown in FIG. 1 is used as an example. It is assumed that the device 9 in the second AS domain needs to advertise the third address prefix, to be specific, the second device is the device 9. Devices communicating with the second device in the second AS domain include the device 7 and the device 8, and the second device sends the third packet to the device 7 and the device 8. The third packet includes the IPv6 prefix reachability TLV, the IPv6 prefix reachability TLV includes the third address prefix and the second mask, the third address prefix and the second mask are represented as "9:100::1/64", and the third address prefix "9:100::1" is the IPv6 address of the second device.

The device 7 receives the third packet, and generates a forwarding entry based on "9:100::1/64" included in the IPv6 prefix reachability TLV. The forwarding entry includes the third address prefix, the second mask (represented as "9:100::1/64"), and the next-hop information; and the device 7 sends the third packet to the device 5. The device 5 is the border device in the second AS domain, to be specific, the device 5 is the third device. The device 5 receives the third packet, obtains the third address prefix "9:100::1" from the IPv6 prefix reachability TLV included in the third packet, and generates the forwarding entry based on "9:100::1/64" included in the IPv6 prefix reachability TLV. The forwarding entry includes the third address prefix, the second mask (represented as "9:100::1/64"), and the next-hop information.

Similarly, the device 8 receives the third packet, generates the forwarding entry based on "9:100::1/64" included in the IPv6 prefix reachability TLV, and further sends the third packet to the device 6. The device 6 is another border device in the second AS domain. The device 6 receives the third packet, obtains the third address prefix "9:100::1" from the IPv6 prefix reachability TLV, and generates the forwarding entry based on "9:100::1/64" included in the IPv6 prefix reachability TLV.

For another example, an example in which the device 9 is the second device is still used. The second device sends the third packet to the device 7 and the device 8. The third packet includes the locator TLV. The locator TLV includes the SRv6 locator of the second device. The SRv6 locator includes the third address prefix, the second mask, and the identification information of the second candidate flexible algorithm. The third address prefix and the second mask are represented as "9:100::/64", the identification information of the second candidate flexible algorithm is "129", and the second candidate flexible algorithm is the flexible algorithm 3.

The device 7 receives the third packet, and the third packet includes the SRv6 locator. The SRv6 locator includes the third address prefix, the second mask (represented as "9:100::/64"), and the identification information "129" of the second candidate flexible algorithm, and generates the forwarding entry based on the SRv6 locator. The forwarding entry includes the third address prefix, the second mask (represented as "9:100::/64"), and the next-hop information. The next-hop information is obtained based on the second candidate flexible algorithm corresponding to "129"; and the device 7 further sends the third packet to the device 5. The device 5 is the border device in the second AS domain, to be specific, the device 5 is the third device. The device 5 receives the third packet, obtains the third address prefix "9:100::" from the SRv6 locator included in the third packet, and generates the forwarding entry based on the SRv6 locator. The forwarding entry includes the third address prefix, the second mask (represented as "9:100::/64"), and the next-hop information. The next-hop information is obtained based on the second candidate flexible algorithm corresponding to "129".

Similarly, the device 8 receives the third packet, generates the forwarding entry based on the SRv6 locator, and further sends the third packet to the device 6. The device 6 is another border device in the second AS domain. The device 6 receives the third packet, obtains the third address prefix "9:100::" from the SRv6 locator included in the third packet, and generates the forwarding entry based on the SRv6 locator.

In step 201, when the third address prefix is the address prefix of the third device, the third device obtains the third address prefix of the third device.

Optionally, the third address prefix is the address prefix advertised by the third device.

The third address prefix may be the IPv6 address of the third device, or may be the address prefix included in the SRv6 locator of the third device.

The SRv6 locator of the third device includes the third address prefix, the second mask, and the identification information of the second candidate flexible algorithm.

The third device sends the third packet to another device in the second AS domain. The third packet includes the third address prefix, to advertise the third address prefix. After receiving the third packet, the another device in the second AS domain generates a forwarding entry based on content in the third packet. For a detailed generation process, refer to related content described above. Details are not described herein again.

Step 202. The third device sends a first packet to a first AS domain, where the first packet includes a first address prefix, and the first address prefix is obtained based on the third address prefix.

In step 202, the third device obtains the first address prefix, and sends the first packet to the first device. The first device is a border device in the first AS domain, and the third device communicates with the first device.

The first packet further includes a mask corresponding to the first address prefix.

For example, the first address prefix may be the same as the third address prefix. In this case, the first address prefix identifies the second device, and the first address prefix is used to send a packet to the second device. Alternatively, the first address prefix is a prefix obtained by aggregating the third address prefix. In this case, the first address prefix identifies the plurality of devices, the plurality of devices include the second device, and the first address prefix is used to send a packet to the plurality of devices.

In other words, the third device obtains the first address prefix in the following two manners, but a manner in which the third device obtains the first address prefix is not limited to the two manners. To be specific, the third device may further obtain the first address prefix in another manner, which is not described one by one herein, but only the two manners are described. The two manners include: In a first manner, when obtaining the third address prefix, the third device uses the third address prefix as the first address prefix.

Optionally, a mask corresponding to the first address prefix is the second mask.

For example, the SR network shown in FIG. 1 is used as an example. It is assumed that the device 6 in the SR network is the third device, the third address prefix obtained by the third device is "9:100::1", and "9:100::1" is the IPv6 address of the device 9. The third device sends the first packet to the first device (the device 4) by using "9:100::1" as the first address prefix. The first address prefix included in the first packet is "9:100::1". In this case, "9:100::1" identifies the device 9, and may be used to send a packet to the device 9.

For another example, the third address prefix obtained by the third device is "9:100::", and "9:100::" is the address prefix included in the SRv6 locator of the device 9. The third device sends the first packet to the first device (the device 4) by using "9:100::" as the first address prefix. The first address prefix included in the first packet is "9:100::".

In a second manner, when obtaining the third address prefix, the third device aggregates a plurality of address prefixes to obtain the first address prefix. The plurality of address prefixes include the third address prefix and an address prefix that has been received and advertised by another device in the second AS domain.

The first address prefix is a common prefix of the plurality of address prefixes. Optionally, the mask corresponding to the first address prefix is used to obtain the common prefix.

For example, it is assumed that the third device (the device 6 of the SR network shown in FIG. 1) has received two address prefixes. The two address prefixes are respectively an address prefix "9:100::3" advertised by the device 7 in the second AS domain and an address prefix "9:100::4" advertised by the device 8 in the second AS domain.

It is assumed that the third address prefix obtained by the third device is "9:100::1", and "9:100::1" is the IPv6 address of the device 9. The third device aggregates the three address prefixes, to obtain a first address prefix "9:100::", and the three address prefixes are respectively "9:100::3", "9:100::4", and "9:100::1". In this case, "9:100::" identifies the three devices, the three devices include the device 7, the device 8, and the device 9, and may be configured to send a packet to the device 7, the device 8, and/or the device 9. The third device sends the first packet to the first device (the device 4). The first address prefix included in the first packet is "9:100::".

Alternatively, it is assumed that the third address prefix obtained by the third device is "9:100::", and "9:100::" is an address prefix included in the SRv6 locator of the device 9. The third device aggregates the three address prefixes, to obtain a first address prefix "9:100::", and the three address prefixes are respectively "9:100::3", "9:100::4", and "9:100::". In this case, "9:100::" identifies the three devices, the three devices include the device 7, the device 8, and the device 9, and may be configured to send a packet to the device 7, the device 8, and/or the device 9. The third device sends the first packet to the first device (the device 4). The first address prefix included in the first packet is "9:100::".

Optionally, because the first AS domain and the second AS domain are two different AS domains, and the third device is the border device in the second AS domain, the first packet sent by the third device to the first AS domain is a BGP packet.

Step 203. The first device receives the first packet, and obtains a second address prefix and identification information of a target flexible algorithm based on the first address prefix included in the first packet.

The first device may further generate a forwarding entry based on the first packet. The forwarding entry includes the first address prefix, the mask corresponding to the first address prefix, and the next-hop information. The next-hop information includes an interface identifier of an outbound interface on the first device, and the outbound interface communicates with the third device.

The first device stores a correspondence between an address prefix, a mask, and identification information of a candidate flexible algorithm.

In step 203, the first device obtains the second address prefix and the identification information of the target flexible algorithm based on the correspondence and the first address prefix. During implementation, the following operations 2031 to 2034 may be used for implementation, and the operations 2031 to 2034 are respectively as follows:

2031. The first device obtains a first address prefix from the first packet, and selects a record from the correspondence as a first record.

For example, the first device performs selection starting from the first record in the correspondence, and uses the selected first record as the first record.

2032. The first device obtains a second address prefix based on the mask and the first address prefix that are included in the first record.

The first device may perform an AND operation on the mask and the first address prefix that are included in the first record, and use a result of the AND operation as the second address prefix.

2033. When the second address prefix matches the address prefix included in the first record, the first device uses the identification information of the candidate flexible algorithm included in the first record as the identification information of the target flexible algorithm, ends the operation 2033, and returns to step 203.

Optionally, when the second address prefix and the address prefix included in the first record meet the following first condition, second condition, and/or second condition, it represents that the second address prefix matches the address prefix included in the first record. The first condition, the second condition, and the third condition are shown as follows:

In the first condition, the second address prefix is the same as the address prefix included in the first record. In other words, when the second address prefix is the same as the address prefix included in the first record, the first device determines that the second address prefix matches the address prefix included in the first record.

In the second condition, for the address prefix included in the first record, the second address prefix is a prefix of the address prefix. In other words, when the second address prefix is the prefix of the address prefix, the first device determines that the second address prefix matches the address prefix included in the first record.

The second address prefix is the prefix of the address prefix, representing that the second address prefix is a part of the address prefix.

In the third condition, for the address prefix included in the first record, the address prefix is a prefix of the second address prefix. In other words, when the address prefix is the prefix of the second address prefix, the first device determines that the second address prefix matches the address prefix included in the first record.

The address prefix is the prefix of the second address prefix, representing that the address prefix is a part of the second address prefix.

2034. When the second address prefix does not match the address prefix included in the first record, the first device selects another record from the correspondence as the first record, and returns to 2032.

For example, it is assumed that the first record is the first record in the correspondence, the first device selects a second record from the correspondence as the first record, and returns to 2032. In other words, the foregoing operations 2032 to 2034 are repeated until a record including an address prefix matching the second address prefix is found from the correspondence.

Optionally, in step 203, the first device further obtains the first mask. When the second address prefix matches the address prefix included in the first record, the first device uses the mask included in the first record as the first mask.

For example, the first device stores a correspondence between an address prefix, a mask, and identification information of a candidate flexible algorithm that are shown in Table 1. For the first record in the correspondence, the address prefix included in the first record is "9:100::", the mask is "/64", and the identification information of the candidate flexible algorithm is "128", where the address prefix "9:100::" is a 64-bit prefix, and the mask "/64" is a mask whose high-order 64 bit values are all 1. For the second record in the correspondence, the address prefix included in the second record is "9:200::", the mask is "/64", and the identification information of the candidate flexible algorithm is "130", where the address prefix "9:200::" is a 64-bit prefix, and the mask "/64" is a mask whose high-order 64 bit values are all 1.

TABLE 1

| Number | Address prefix + mask | Identification information of a candidate flexible algorithm |
|---|---|---|
| 1 | 9:100::/64 | 128 |
| 2 | 9:200::/64 | 130 |
| ... | ... | ... |

It is assumed that the first address prefix included in the first packet received by the first device (the device 4 in the SR network 100 shown in FIG. 1) is "9:100::1". The first device selects the first record from the correspondence shown in Table 1 as the first record, and performs an AND operation on the mask "/64" included in the first record and the first address prefix "9:100::1", to obtain the second address prefix "9:10::". The second address prefix "9:100::" is the same as the address prefix "9:100::" in the first record. Therefore, it is determined that the two match each other. Therefore, the identification information "128" of the candidate flexible algorithm included in the first record is used as the identification information of the target flexible algorithm, and the mask "/64" in the first record is used as the first mask.

For another example, it is assumed that the first address prefix included in the first packet received by the first device is "9:100::", to be specific, the first address prefix is "9:100::". The first device selects the first record from the correspondence shown in Table 1 as the first record, and performs an AND operation on the mask "/64" included in the first record and the first address prefix "9:100::", to obtain the second address prefix "9:100::". The second address prefix "9:100::" is the same as the address prefix "9:100::" in the first record. Therefore, it is determined that the two match each other. Therefore, the identification information "128" of the candidate flexible algorithm included in the first record is used as the identification information of the target flexible algorithm, and the mask "/64" in the first record is used as the first mask.

Step 204. The first device sends a second packet to a device in the first AS domain, where the second packet includes the second address prefix and the identification information of the target flexible algorithm.

Optionally, when the first device further obtains the first mask, the second packet further includes the first mask.

The second packet is an ISIS packet. The second packet includes a locator TLV, and the locator TLV includes the second address prefix and the identification information of the target flexible algorithm. Optionally, the locator TLV further includes the first mask.

Optionally, the locator TLV includes an SRv6 locator, and the SRv6 locator includes the second address prefix, the first mask, and the identification information of the target flexible algorithm.

When the device in the first AS domain receives the second packet, the device receives the second packet. When the second packet includes the second address prefix and the identification information of the target flexible algorithm, the device generates a forwarding entry based on the SRv6 locator included in the second packet. The forwarding entry includes the second address prefix, the second mask, and the next-hop information, and the next-hop information is obtained based on the target flexible algorithm. Optionally, the next-hop information includes an interface identifier of an outbound interface on the device, and a device communicating with the outbound interface is located in a network topology corresponding to the target flexible algorithm.

Devices that obtain the second packet in the first AS domain may generate a forwarding entry in the foregoing manner, and the next-hop information in the forwarding entry is obtained based on the target flexible algorithm, so that a path corresponding to the target flexible algorithm is formed in the first AS domain, and the path is located in the network topology corresponding to the target flexible algorithm.

In this way, when the device needs to send a packet to the second device, the device performs an AND operation on a destination address of the packet and the first mask included in the forwarding entry, to obtain an address prefix. If the obtained address prefix is the same as the second address prefix included in the forwarding entry, it represents that the packet matches the second address prefix. The device sends the packet based on the next-hop information included in the forwarding entry, to be specific, sends the packet by using the path corresponding to the target flexible algorithm.

For example, for the SR network 100 shown in FIG. 1, the device 4 in the SR network 100 sends a second packet to the device 2. The second packet includes an SRv6 locator, the SRv6 locator includes the second address prefix, the first mask (represented as "9:100::/64"), and identification information "128" of a target flexible algorithm, and the device 2 generates a forwarding entry based on the SRv6 locator. The forwarding entry includes the second address prefix, the first mask (represented as "9:100::/64"), and the next-hop information, and the next-hop information is obtained based on a target flexible algorithm corresponding to "128".

The device 2 receives the second packet, and generates the forwarding entry based on the SRv6 locator. The forwarding entry includes the second address prefix, the first mask (represented as "9:100::/64"), and the next-hop information. The next-hop information is obtained based on the target flexible algorithm corresponding to "128", the next-hop information includes the interface identifier of the outbound interface on the device 2, and the device 4 communicating with the outbound interface is a device in the second network topology corresponding to the target flexible algorithm. The device 2 further sends the second packet to the device 0.

When the device 2 needs to send a packet to the device 9, it is assumed that a destination address of the packet is "9::100:1", and an AND operation is performed on the destination address "9:100::1" and the first mask "/64" included in the forwarding entry, to obtain an address prefix "9::100::". The address prefix "9::100::" is the same as the second address prefix "9:100::" included in the forwarding entry, representing that the packet matches the second address prefix "9:100::". The device 2 sends the packet based on the next-hop information included in the forwarding entry, so that the path corresponding to the target flexible algorithm is determined, and the packet is sent by using the path corresponding to the target flexible algorithm.

In embodiments of this application, after receiving the first packet, the first device obtains the second address prefix and the identification information of the target flexible algorithm based on the first address prefix in the first packet, and sends the second packet to the device in the first AS domain. The second packet includes the second address prefix and the identification information of the target flexible algorithm, the second address prefix is used to send the packet to the second device, and the target flexible algorithm is used to calculate a forwarding path of the packet. In this way, the device in the first AS domain may obtain target flexibility. When the device in the first AS domain needs to send the packet to the second device, the device obtains the second address prefix based on the destination address of the packet, determines, based on the second address prefix, the path corresponding to the target flexible algorithm, and sends the packet to the second device by using the path corresponding to the target flexible algorithm. The path is located in a network slice corresponding to the target flexible algorithm, so that flexibility of network deployment may be improved.

Figure 3:
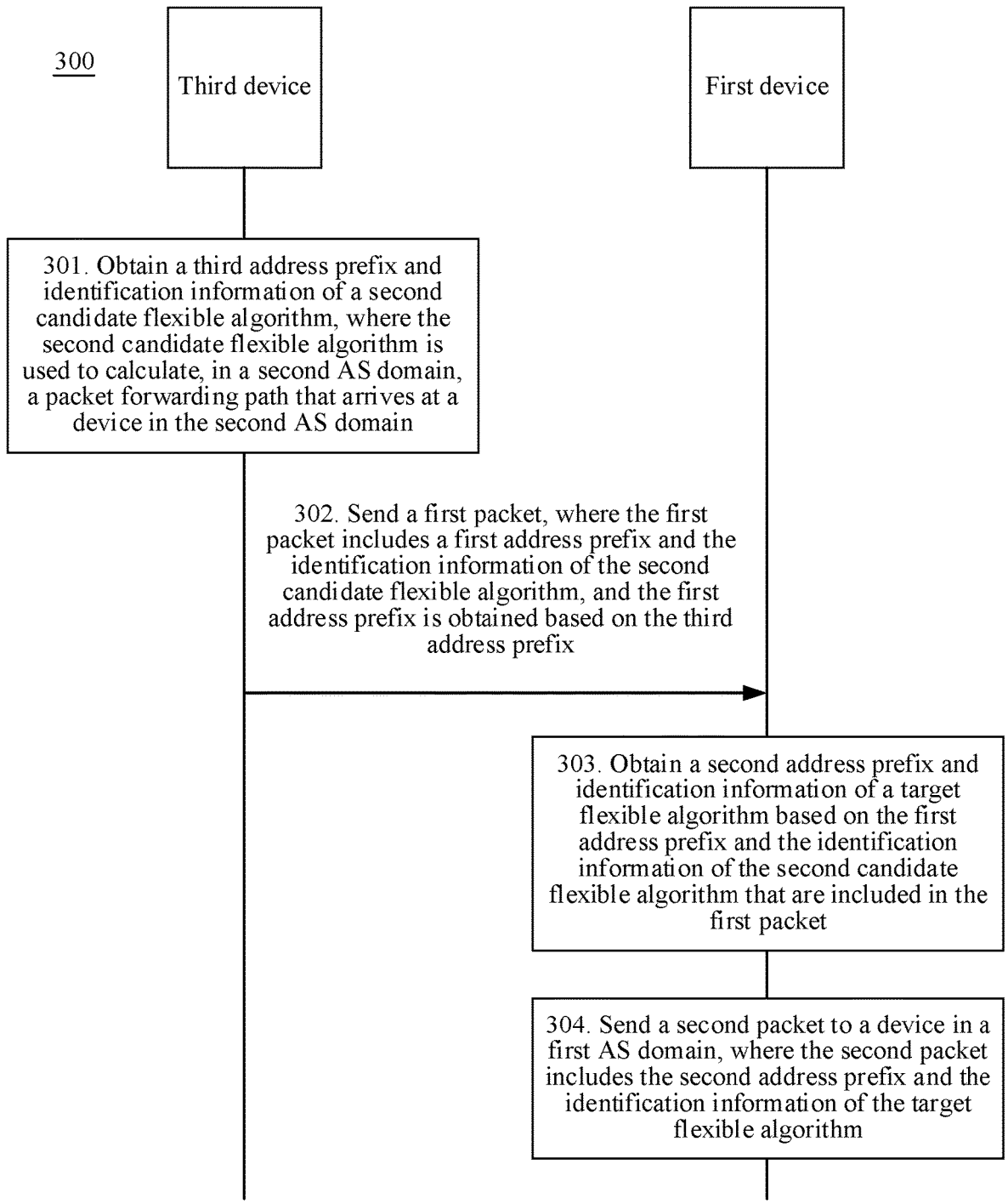
FIG. 3 is a flowchart of another packet sending method according to an embodiment of this application.

Referring to FIG. 3, embodiments of this application provide a packet sending method 300. The method 300 may be applied to the SR network 100 shown in FIG. 1. In the method 300, the first packet sent by the third device to the first device includes the identification information of the flexible algorithm corresponding to the second AS domain. After receiving the first packet, the first device obtains the identification information of the target flexible algorithm based on the first packet. For example, the SR network 100 shown in FIG. 1 is used as an example. A third device may be a device 6, and a first device may be a device 4. A first packet sent by the device 6 to the device 4 includes identification information of a flexible algorithm corresponding to a second AS domain. After receiving the first packet, the device 4 obtains identification information of a target flexible algorithm based on the first packet. The method 300 includes the following steps.

Step 301. A third device obtains a third address prefix and identification information of a second candidate flexible algorithm, where the third device is a border device in a second AS domain, and the second candidate flexible algorithm is used to calculate, in the second AS domain, a packet forwarding path that arrives a device in the second AS domain.

The third address prefix and the identification information of the second candidate flexible algorithm are respectively an address prefix and identification information of the flexible algorithm that are advertised by the device in the second AS domain. The device in the second AS domain includes the third device or the second device, and the second device is another device other than the third device in the second AS domain.

In other words, the third address prefix and the identification information of the second candidate flexible algorithm are respectively an address prefix of the third device and the identification information of the flexible algorithm. Alternatively, the third address prefix and the identification information of the second candidate flexible algorithm are respectively an address prefix and the identification information of the flexible algorithm that are advertised by the second device.

In step 301, when the third address prefix and the identification information of the second candidate flexible algorithm are respectively the address prefix and the identification information of the flexible algorithm that are advertised by the second device, the third device receives a third packet. The third packet includes the third address prefix and the identification information of the second candidate flexible algorithm that are advertised by the second device, and obtains the third address prefix and the identification information of the second candidate flexible algorithm from the third packet. The third packet may be a packet sent by the second device in the second AS domain.

Optionally, the third packet further includes a second mask, and the second mask is a mask advertised by the second device. The third device may further obtain the second mask from the third packet.

The third packet includes a locator TLV, the locator TLV includes an SRv6 locator of the second device, and the SRv6 locator includes the third address prefix, the second mask, and the identification information of the second candidate flexible algorithm.

For the third packet, the second device sends the third packet to the device that is in the second AS domain and that communicates with the second device. For each device communicating with the second device, the device receives the third packet, and generates a forwarding entry based on the SRv6 locator. The forwarding entry includes the third address prefix, the second mask, and the next-hop information, and the next-hop information is obtained based on the second candidate flexible algorithm. The device may further forward the third packet to another device in the second AS domain. When the device is a border device in the second AS domain, to be specific, the device is the third device, the following operation in step 301 is performed.

For example, the SR network 100 shown in FIG. 1 is used as an example. It is assumed that the device 9 in the second AS domain needs to advertise the third address prefix, to be specific, the second device is the device 9. Devices communicating with the second device in the second AS domain include the device 7 and the device 8, and the second device sends the third packet to the device 7 and the device 8. The third packet includes the locator TLV. The locator TLV includes the SRv6 locator of the second device. The SRv6 locator includes the third address prefix, the second mask, and the identification information of the second candidate flexible algorithm. The third address prefix and the second mask are represented as "9:100::/64", and the identification information of the second candidate flexible algorithm is "129".

The device 7 receives the third packet, and the SRv6 locator includes the third address prefix, the second mask (represented as "9:00::/64"), and the identification information "129" of the second candidate flexible algorithm, and generates the forwarding entry based on the SRv6 locator.

The forwarding entry includes the third address prefix, the second mask (represented as "9:100::/64"), and the next-hop information, and the next-hop information is obtained based on the second candidate flexible algorithm corresponding to "129". The device 7 further sends the third packet to the device 5. The device 5 is the border device in the second AS domain, to be specific, the device 5 is the third device. The device 5 receives the third packet, obtains the third address prefix "9:100::" from the SRv6 locator included in the third packet, and generates the forwarding entry based on the SRv6 locator. The forwarding entry includes the third address prefix, the second mask (represented as "9:100::/64"), and the next-hop information. The next-hop information is obtained based on the second candidate flexible algorithm corresponding to "129".

Similarly, the device 8 receives the third packet, generates the forwarding entry based on the SRv6 locator, and further sends the third packet to the device 6. The device 6 is another border device in the second AS domain. The device 6 receives the third packet, obtains the third address prefix "9:100::" from the SRv6 locator included in the third packet, and generates the forwarding entry based on the SRv6 locator.

In step 301, when the third address prefix and the identification information of the second candidate flexible algorithm are respectively the address prefix of the third device and the identification information of the flexible algorithm, the third device obtains the third address prefix and the identification information of the second candidate flexible algorithm that are advertised by the third device.

Optionally, the third address prefix and the identification information of the second candidate flexible algorithm are respectively the address prefix and the identification information of the flexible algorithm that are advertised by the third device.

The third device sends a third packet to another device in the second AS domain. The third packet includes an SRv6 locator of the third device. The SRv6 locator of the third device includes the third address prefix, the second mask, and the identification information of the second candidate flexible algorithm.

In step 301, the third device obtains the third address prefix and the identification information of the second candidate flexible algorithm from the SRv6 locator of the third device. The third device may further obtain the second mask.

After receiving the third packet, the another device in the second AS domain generates a forwarding entry based on content in the third packet. For a detailed generation process, refer to related content described above. Details are not described herein again.

Step 302. The third device sends a first packet to a first AS domain, where the first packet includes a first address prefix and the identification information of the second candidate flexible algorithm, and the first address prefix is obtained based on the third address prefix.

In this step, the third device obtains the first address prefix, and sends the first packet to the first device. The first device is a border device in the first AS domain, and the third device communicates with the first device.

Optionally, the first packet may further include a mask corresponding to the first address prefix.

The first packet is a BGP packet. In step 302, the first packet is extended, so that the first packet includes a TLV. The TLV includes the first address prefix and the identification information of the second candidate flexible algorithm. Optionally, the TLV further includes the mask corresponding to the first address prefix.

The first address prefix may be the same as the obtained third address prefix. In this case, the first address prefix identifies the second device, and the first address prefix is used to send a packet to the second device. Optionally, a mask corresponding to the first address prefix is the second mask. Alternatively, the first address prefix is a prefix obtained by the third device by aggregating the obtained third address prefix. In this case, the first address prefix identifies the plurality of devices, the plurality of devices include the second device, and the first address prefix is used to send a packet to the plurality of devices. Optionally, the mask corresponding to the first address prefix is used to obtain the aggregated prefix.

For a detailed implementation process in which the third device obtains the first address prefix, refer to related content in step 202 in the method 200 shown in FIG. 2, and details are not described herein again.

For example, it is assumed that the third packet includes the SRv6 locator of the second device, and the SRv6 locator includes "9:100::/64" and "129". The third device receives the third packet, obtains the third address prefix "9:100::" from the locator TLV included in the third packet, uses "9:100::" as the first address prefix, and sends the first packet to the first device (the device 4). The first packet includes the first address prefix, the second mask, and the identification information of the second candidate flexible algorithm, to be specific, the first packet includes "9:100::/64" and "129".

Step 303. The first device receives the first packet, and obtains the second address prefix and the identification information of the target flexible algorithm based on the first address prefix and the identification information of the second candidate flexible algorithm that are included in the first packet.

In this step, the second address prefix and the identification information of the target flexible algorithm may be obtained in the following two manners. However, a manner of obtaining, by the first device, the second address prefix and the identification information of the target flexible algorithm is not limited to the two manners. In other words, the first device may further obtain the second address prefix and the identification information of the target flexible algorithm in another manner, which is not listed one by one herein, but only the two manners are described. The two manners are respectively as follows:

In a first manner, the first device separately uses the first address prefix and the identification information of the second candidate flexible algorithm that are included in the first packet as the second address prefix and the identification information of the target flexible algorithm.

When the first packet further includes the second mask, the first device further uses the second mask as the first mask.

Optionally, in the first manner, the first device further determines whether the flexible algorithm deployed in the first AS domain includes the second candidate flexible algorithm, and if the flexible algorithm includes the second candidate flexible algorithm, separately uses the first address prefix and the identification information of the second candidate flexible algorithm that are included in the first packet as the second address prefix and the identification information of the target flexible algorithm.

For example, the first device (the device 4) receives the first packet. The first packet includes "9:100::/64" and "129", uses "9:100::" as the second address prefix, uses "129" as the identification information of the target flexible algorithm, and uses "/64" as the first mask.

In a second manner, the first device obtains a first correspondence based on the first address prefix. The first correspondence includes the second address prefix and the identification information of the first candidate flexible algorithm, and obtains the identification information of the target flexible algorithm based on the identification information of the first candidate flexible algorithm and the identification information of the second candidate flexible algorithm.

In the second manner, the first device may select identification information of one candidate flexible algorithm from the identification information of the first candidate flexible algorithm and the identification information of the second candidate flexible algorithm as the identification information of the target flexible algorithm. For example, the first device may select the identification information of the first candidate flexible algorithm as the identification information of the target flexible algorithm, and/or the first device may select the identification information of the second candidate flexible algorithm as the identification information of the target flexible algorithm.

Optionally, the first device stores a correspondence between an address prefix, a mask, and identification information of a candidate flexible algorithm. In the second manner, the correspondence may be implemented through the following operations 3031 to 3034. The operations 3031 to 3034 are respectively as follows:

3031. The first device obtains a first address prefix from the first packet, and selects a record from the correspondence as a first record.

For example, the first device performs selection starting from the first record in the correspondence, and uses the selected first record as the first record.

3032. The first device obtains a second address prefix based on the mask and the first address prefix that are included in the first record.

The first device may perform an AND operation on the mask and the first address prefix that are included in the first record, and use a result of the AND operation as the second address prefix.

3033. When the second address prefix matches the address prefix included in the first record, the first device uses the identification information of the candidate flexible algorithm included in the first record as the identification information of the first candidate flexible algorithm, to obtain a first correspondence including the second address prefix and the identification information of the first candidate flexible algorithm, ends the operation 3033, and returns to step 303.

Optionally, for a detailed implementation process in which the first device determines that the second address prefix matches the address prefix included in the first record, refer to related content in operation 2033 in the method 200 shown in FIG. 2. Details are not described herein again.

3034. When the second address prefix does not match the address prefix included in the first record, the first device selects another record from the correspondence as the first record, and returns to 3032.

For example, it is assumed that the first record is the first record in the correspondence, the first device selects a second record from the correspondence as the first record, and returns to 3032. In other words, the foregoing operations 3032 to 3034 are repeated until a record including an address prefix matching the second address prefix is found from the correspondence.

Optionally, the first device further obtains the first mask. When the second address prefix matches the address prefix included in the first record, the first device uses the mask included in the first record as the first mask, or the first device uses the second mask included in the first packet as the first mask.

Optionally, when the first device uses the identification information of the first candidate flexible algorithm as the identification information of the target flexible algorithm, the first device may use the mask included in the first record as the first mask; or when the first device uses the identification information of the second candidate flexible algorithm as the identification information of the target flexible algorithm, the first device may use the second mask included in the first packet as the first mask.

Optionally, the first device stores a correspondence between an address prefix and the identification information of the candidate flexible algorithm. In the second manner, the first device uses the first address prefix in the first packet as the second address prefix, obtains, based on the second address prefix, the identification information of a corresponding candidate flexible algorithm from the correspondence between the address prefix and the identification information of the candidate flexible algorithm, and uses the obtained identification information of the candidate flexible algorithm as the identification information of the first candidate flexible algorithm, to obtain the first correspondence including the second address prefix and the identification information of the first candidate flexible algorithm.

Step 304 is the same as step 204 in the method 200 shown in FIG. 2, and details are not described herein again.

In embodiments of this application, because the first packet is extended, the first packet sent by the third device to the first device not only includes the first address prefix, but further includes the identification information of the second candidate flexible algorithm. In this way, the first device obtains the second address prefix and the identification information of the target flexible algorithm based on the first address prefix and the identification information of the second candidate flexible algorithm that are in the first packet, and sends the second packet to the device in the first AS domain. The second packet includes the second address prefix and the identification information of the target flexible algorithm, the second address prefix is used to send the packet to the second device, and the target flexible algorithm is used to calculate a path of the packet. In this way, the device in the first AS domain may obtain target flexibility. When the device in the first AS domain needs to send the packet to the second device, the device obtains the second address prefix based on the destination address of the packet, determines, based on the second address prefix, the path corresponding to the target flexible algorithm, and sends the packet to the second device by using the path corresponding to the target flexible algorithm. The path is located in a network slice corresponding to the target flexible algorithm, so that flexibility of network deployment may be improved.

Figure 4:
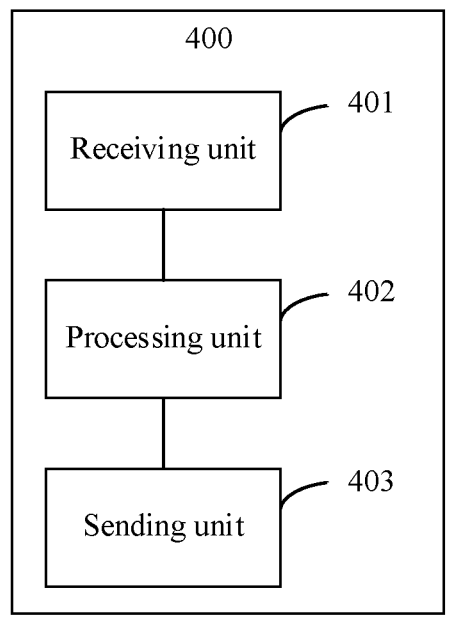
FIG. 4 is a schematic diagram of a structure of a packet sending apparatus according to an embodiment of this application.

Referring to FIG. 4, embodiments of this application provide a packet sending apparatus 400. The apparatus 400 is deployed on the first device provided in any one of the foregoing embodiments, for example, deployed on the first device (a device 3 or a device 4) in the SR network 100 shown in FIG. 1, the first device in the method 200 shown in FIG. 2, or the first device in the method 300 shown in FIG. 3, and includes:

a receiving unit 401, configured to receive a first packet, where the first packet includes a first address prefix, the apparatus 400 is a border device in a first autonomous system AS domain, the first address prefix is obtained based on an address prefix advertised by a second device, the second device is located in a second AS domain, the first AS domain is different from the second AS domain, and the first address prefix is used to send a packet to the second device;

a processing unit 402, configured to obtain a second address prefix and identification information of a target flexible algorithm based on the first address prefix, where the second address prefix is used to send a packet to the second device; and a sending unit 403, configured to send a second packet to a device in the first AS domain, where the second packet includes the second address prefix and the identification information of the target flexible algorithm, so that the device in the first AS domain forwards, through a path corresponding to the target flexible algorithm, a packet that matches the second address prefix.

Optionally, for a detailed implementation process in which the receiving unit 401 receives the first packet, refer to related content in step 203 in the method 200 shown in FIG. 2 and step 303 in the method 300 shown in FIG. 3. Details are not described herein again.

Optionally, for a detailed implementation process in which the processing unit 402 obtains the second address prefix and the identification information of the target flexible algorithm, refer to related content in step 203 in the method 200 shown in FIG. 2 and step 303 in the method 300 shown in FIG. 3. Details are not described herein again.

Optionally, for a detailed implementation process in which the sending unit 403 sends the second packet, refer to related content in step 204 in the method 200 shown in FIG. 2 and step 304 in the method 300 shown in FIG. 3. Details are not described herein again.

Optionally, the processing unit 402 is configured to determine a first correspondence based on the first address prefix. The first correspondence includes a correspondence between the second address prefix and identification information of a first candidate flexible algorithm.

Optionally, for a detailed implementation process of obtaining the first correspondence by the processing unit 402, refer to related content in step 303 in the method 300 shown in FIG. 3. Details are not described herein again.

Optionally, the processing unit 402 is further configured to use the first candidate flexible algorithm as the target flexible algorithm.

Optionally, the first packet further includes identification information of a second candidate flexible algorithm, and the processing unit 402 is further configured to determine the target flexible algorithm from the first candidate flexible algorithm and the second candidate flexible algorithm.

Optionally, for a detailed implementation process in which the processing unit 402 determines the identification information of the target flexible algorithm, refer to related content in step 303 in the method 300 shown in FIG. 3. Details are not described herein again.

Optionally, the second address prefix is a prefix in a segment routing internet protocol version 6 locator SRv6 locator, the second packet includes a locator type-length-value locator TLV, and the locator TLV includes the second address prefix and the identification information of the target flexible algorithm.

Optionally, for detailed descriptions of the locator TLV included in the second packet, refer to related content in step 204 in the method 200 shown in FIG. 2 and step 304 in the method 300 shown in FIG. 3. Details are not described herein again.

Optionally, the identification information of the second candidate flexible algorithm is carried in a type-length-value TLV of the first packet.

Optionally, the first address prefix matches the second address prefix.

Optionally, the first packet is a border gateway protocol BGP packet.

In embodiments of this application, the receiving unit receives the first packet. The first packet includes the first address prefix, the first address prefix is obtained based on the address prefix advertised by the second device, and the second device is located in the second AS domain. The processing unit obtains the second address prefix and the identification information of the target flexible algorithm based on the first address prefix in the first packet. In this way, the sending unit sends the second address prefix and the identification information of the target flexible algorithm to the device in the first AS domain, and the second address prefix is used to send the packet to the second device, so that the device in the first AS domain may also obtain the target flexible algorithm corresponding to the device in the second AS domain. In this way, when the device in the first AS domain needs to send the packet that matches the second address prefix, the device may send the packet by using the path corresponding to the target flexible algorithm. This improves flexibility of network deployment.

Figure 5:
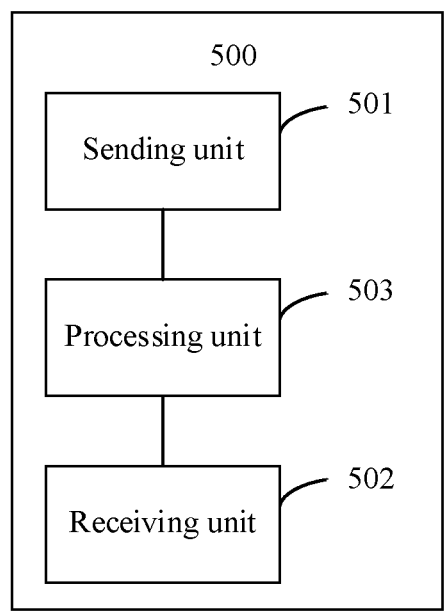
FIG. 5 is a schematic diagram of a structure of another packet sending apparatus according to an embodiment of this application.

Referring to FIG. 5, embodiments of this application provide a packet sending apparatus 500. The apparatus 500 is deployed on the third device provided in any one of the foregoing embodiments, for example, deployed on the third device (a device 5 or a device 6) in the SR network 100 shown in FIG. 1, the third device in the method 200 shown in FIG. 2, or the third device in the method 300 shown in FIG. 3, and includes:

a sending unit 501, configured to send a first packet to a device in a first autonomous system AS domain, where the first packet includes a first address prefix and identification information of a flexible algorithm, so that a device in the first AS domain forwards a packet through a path corresponding to the flexible algorithm, and the packet matches an address prefix of a second device, where the apparatus 500 is a border device in a second AS domain, the first AS domain is different from the second AS domain, the first address prefix identifies a second device in the second AS domain, and a packet forwarding path corresponding to the flexible algorithm is used to forward a packet to the second device in the second AS domain.

Optionally, for a detailed implementation process in which the sending unit 501 sends the first packet, refer to related content in step 302 in the method 300 shown in FIG. 3. Details are not described herein again.

Optionally, the apparatus 500 further includes a receiving unit 502.

The receiving unit 502 is configured to receive a third packet, where the third packet includes an address prefix advertised by the second device and the identification information of the flexible algorithm, and the first address prefix is obtained based on the address prefix advertised by the second device.

Optionally, for a detailed implementation process in which the receiving unit 502 receives the third packet, refer to related content in step 301 in the method 300 shown in FIG. 3. Details are not described herein again.

Optionally, the apparatus 500 further includes a processing unit 503.

The first address prefix is obtained by the processing unit 503 based on the address prefix advertised by the second device.

Optionally, for a detailed implementation process in which the processing unit 503 obtains the first address prefix, refer to related content in step 301 in the method 300 shown in FIG. 3. Details are not described herein again.

Optionally, the first packet is a border gateway protocol BGP packet.

Optionally, the identification information of the flexible algorithm is carried in a type-length-value TLV of the first packet.

Optionally, the third packet includes a locator type-length-value locator TLV, and the locator TLV includes the address prefix advertised by the second device and the identification information of the flexible algorithm.

Optionally, for detailed descriptions of the locator TLV included in the second packet, refer to related content in step 301 in the method 300 shown in FIG. 3. Details are not described herein again.

Optionally, the address prefix advertised by the second device is different from the first address prefix.

Optionally, the second device is the same as the apparatus.

In embodiments of this application, the first packet sent by the sending unit to the device in the first AS domain includes the identification information of the flexible algorithm. In this way, it is ensured that the border device in the first AS domain may obtain the target flexible algorithm corresponding to the second device, to send the identification information of the target flexible algorithm to the device in the first AS domain. In this way, when the device in the first AS domain needs to send a packet to the second device, the device may send the packet by using the path corresponding to the target flexible algorithm. This improves flexibility of network deployment.

Figure 6:
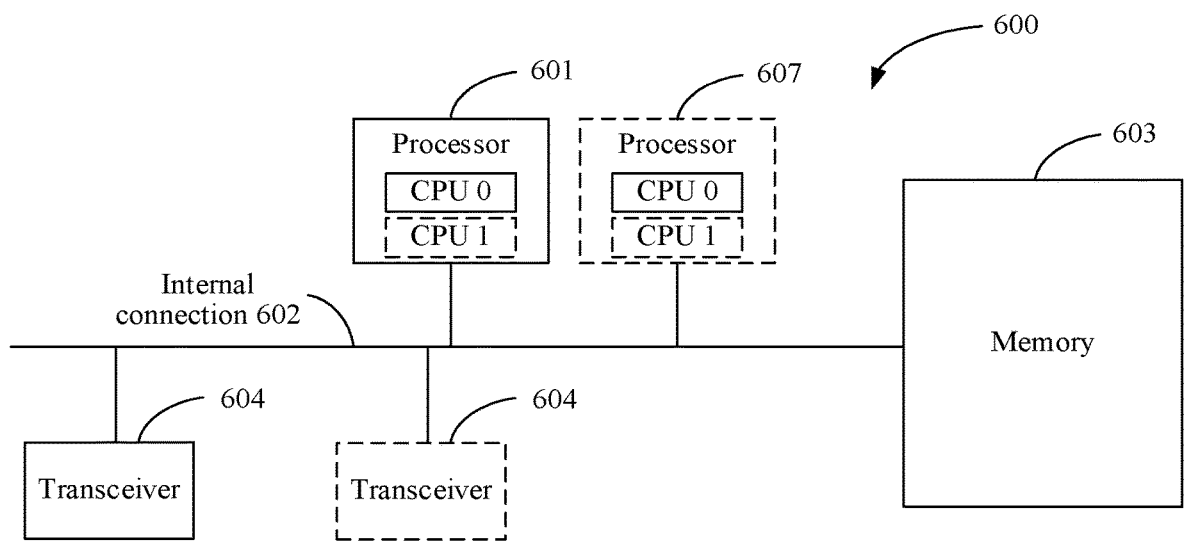
FIG. 6 is a schematic diagram of a structure of another packet sending apparatus according to an embodiment of this application.

FIG. 6 is a schematic diagram of a packet sending apparatus 600 according to an embodiment of this application. The apparatus 600 may be the first device provided in any one of the foregoing embodiments. For example, the apparatus 600 may be the first device (a device 3 or a device 4) of the SR network 100 shown in FIG. 1, the first device in the method 200 shown in FIG. 2, or the first device in the method 300 shown in FIG. 3. The apparatus 600 includes at least one processor 601, an internal connection 602, a memory 603, and at least one transceiver 604.

The apparatus 600 is an apparatus of a hardware structure, and may be configured to implement functional modules in the apparatus 400 shown in FIG. 4. For example, a person skilled in the art may figure out that the processing unit 402 in the apparatus 400 shown in FIG. 4 may be implemented by the at least one processor 601 by invoking code in the memory 603, and the receiving unit 401 and the sending unit 403 in the apparatus 400 shown in FIG. 4 may be implemented by the at least one transceiver 604.

The apparatus 600 may be further configured to implement a function of the first device in any one of the foregoing embodiments.

The processor 601 may be a general-purpose central processing unit (CPU), a network processor (NP), a microprocessor, an application-specific integrated circuit (ASIC), or one or more integrated circuits configured to control program execution of the solutions of this application.

The internal connection 602 may include a path for transmitting information between the foregoing components. The internal connection 602 may be a board, a bus, or the like.

The at least one transceiver 604 is configured to communicate with another device or a communication network.

The memory 603 may be a read-only memory (ROM), another type of static storage device that can store static information and instructions, a random access memory (RAM), or another type of dynamic storage device that can store information and instructions, or may be an electrically erasable programmable read-only memory (EEPROM) or a compact disc read-only memory (CD-ROM) or another compact disc storage, optical disc storage (including a compressed optical disc, a laser disc, an optical disc, a digital versatile optical disc, and a Blu-ray disc), magnetic disk storage media, or another magnetic storage device, or any another medium that can be used to carry or store desired program code in the form of instructions or a data structure and that can be accessed by a computer, but not limited thereto. The memory may exist independently, and is connected to the processor through the bus. The memory may alternatively be integrated with the processor.

The memory 603 is configured to store application program code for executing the solutions in this application, and the processor 601 controls execution. The processor 601 is configured to execute the application program code stored in the memory 603, and cooperate with the at least one transceiver 604, so that the apparatus 600 implements functions in the method in this patent.

During specific implementation, in an embodiment, the processor 601 may include one or more CPUs, for example, a CPU 0 and a CPU 1 in FIG. 6.

In a specific implementation, in an embodiment, the apparatus 600 may include a plurality of processors, for example, the processor 601 and a processor 607 shown in FIG. 6. Each of the processors may be a single-core (single-CPU) processor, or may be a multi-core (multi-CPU) processor. The processor herein may be one or more devices, circuits, and/or processing cores configured to process data (for example, computer program instructions).

Figure 7:
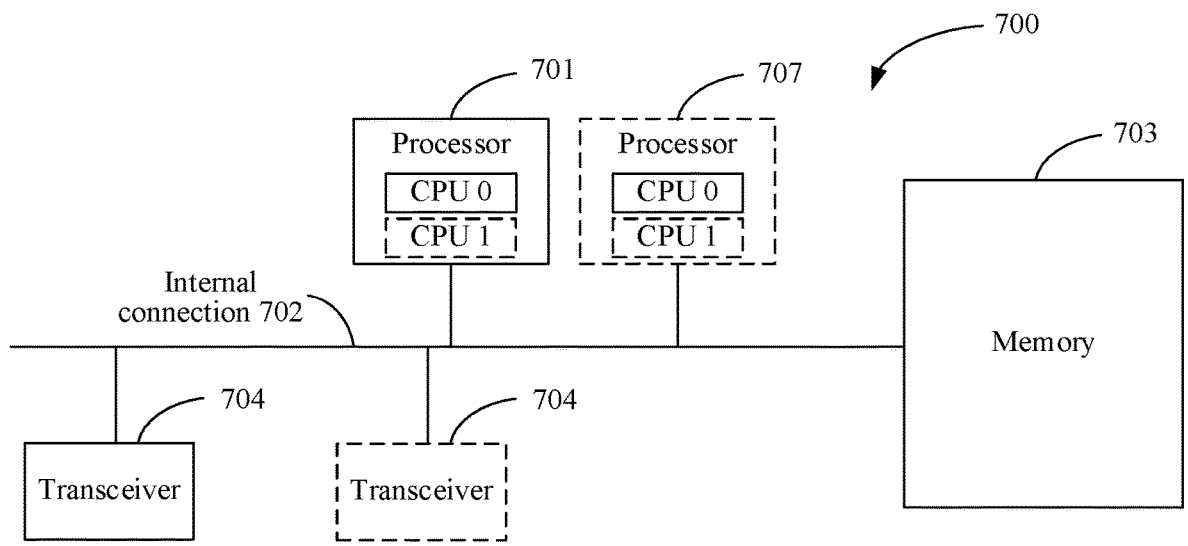
FIG. 7 is a schematic diagram of a structure of another packet sending apparatus according to an embodiment of this application.

FIG. 7 is a schematic diagram of a packet sending apparatus 700 according to an embodiment of this application. The apparatus 700 may be the third device provided in any one of the foregoing embodiments. For example, the apparatus 700 may be the third device (a device 5 or a device 6) in the SR network 100 shown in FIG. 1, the third device in the method 200 shown in FIG. 2, or the third device in the method 300 shown in FIG. 3. The apparatus 700 includes at least one processor 701, an internal connection 702, a memory 703, and at least one transceiver 704.

The apparatus 700 is an apparatus of a hardware structure, and may be configured to implement functional modules in the apparatus 500 shown in FIG. 5. For example, a person skilled in the art may figure out that the processing unit 503 in the apparatus 500 shown in FIG. 5 may be implemented by the at least one processor 701 by invoking code in the memory 703, and the sending unit 501 and the receiving unit 502 in the apparatus 500 shown in FIG. 5 may be implemented by the at least one transceiver 704.

The apparatus 700 may be further configured to implement a function of the third device in any one of the foregoing embodiments.

The processor 701 may be a general-purpose central processing unit (CPU), a network processor (NP), a microprocessor, an application-specific integrated circuit (ASIC), or one or more integrated circuits configured to control program execution of the solutions of this application.

The internal connection 702 may include a path for transmitting information between the foregoing components. The internal connection 702 may be a board, a bus, or the like.

The at least one transceiver 704 is configured to communicate with another device or a communication network.

The memory 703 may be a read-only memory (ROM), another type of static storage device that can store static information and instructions, a random access memory (RAM), or another type of dynamic storage device that can store information and instructions, or may be an electrically erasable programmable read-only memory (EEPROM) or a compact disc read-only memory (CD-ROM) or another compact disc storage, optical disc storage (including a compressed optical disc, a laser disc, an optical disc, a digital versatile optical disc, and a Blu-ray disc), magnetic disk storage media, or another magnetic storage device, or any another medium that can be used to carry or store desired program code in the form of instructions or a data structure and that can be accessed by a computer, but not limited thereto. The memory may exist independently, and is connected to the processor through the bus. The memory may alternatively be integrated with the processor.

The memory 703 is configured to store application program code for executing the solutions in this application, and the processor 701 controls execution. The processor 701 is configured to execute the application program code stored in the memory 703, and cooperate with the at least one transceiver 704, so that the apparatus 700 implements functions in the method in this patent.

During specific implementation, in an embodiment, the processor 701 may include one or more CPUs, for example, a CPU 0 and a CPU 1 in FIG. 7.

In a specific implementation, in an embodiment, the apparatus 700 may include a plurality of processors, for example, the processor 701 and a processor 707 shown in FIG. 7. Each of the processors may be a single-core (single-CPU) processor, or may be a multi-core (multi-CPU) processor. The processor herein may be one or more devices, circuits, and/or processing cores configured to process data (for example, computer program instructions).

Figure 8:
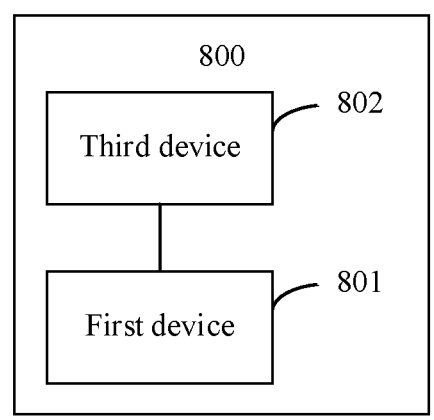
FIG. 8 is a schematic diagram of a structure of a packet sending system according to an embodiment of this application.

Referring to FIG. 8, embodiments of this application provide a packet sending system 800. The system 800 includes the apparatus 400 shown in FIG. 4 and the apparatus 500 shown in FIG. 5, or the system 800 includes the apparatus 600 shown in FIG. 6 and the apparatus 700 shown in FIG. 7.

The apparatus 400 shown in FIG. 4 or the apparatus 600 shown in FIG. 6 may be a first device 801, and the apparatus 500 shown in FIG. 5 or the apparatus 700 shown in FIG. 7 may be a third device 802.

A person of ordinary skill in the art may understand that all or some of the steps of the embodiments may be implemented by hardware or a program instructing related hardware. The program may be stored in a computer-readable storage medium. The storage medium may be a read-only memory, a magnetic disk, an optical disc, or the like.

In this application, the terms "first", "second", and the like are used to distinguish between same or similar items whose effects and functions are basically the same. It should be understood that there is no logical or time-sequence dependency between "first", "second", and "n$^{th}$", and a quantity and an execution sequence are not limited. It should also be understood that although terms such as "first" and "second" are used in the following descriptions to describe various elements, these elements should not be limited by the terms. These terms are merely used to distinguish one element from another element. For example, without departing from the scope of the various examples, a first image may be referred to as a second image, and similarly, a second image may be referred to as a first image. Both the first image and the second image may be images, and in some cases, may be separate and different images.

It should be further understood that sequence numbers of processes do not mean execution sequences in embodiments of this application. The execution sequences of the processes should be determined based on functions and internal logic of the processes, and should not be construed as any limitation on the implementation processes of embodiments of this application.

The foregoing descriptions are only optional embodiments of this application, but are not intended to limit this application. Any modification, equivalent replacement, or improvement made within the principle of this application should fall within the protection scope of this application.

What is claimed is:

1. A network device, applied to a first device which is a border device in a first autonomous system (AS) domain, the network device comprises:
   one or more memories configured to store instructions; and
   one or more processors coupled to the one or more memories and configured to execute the instructions to cause the network device to:
   receive a first packet, wherein the first packet comprises a first address prefix, the first address prefix is obtained based on an address prefix advertised by a second device, the second device is located in a second AS domain, the first AS domain is different from the second AS domain, and the first address prefix is used to send a packet to the second device;
   obtain a second address prefix and identification information of a target flexible algorithm based on the first address prefix, wherein the second address prefix is used to send the packet to the second device; and
   send a second packet to a device in the first AS domain, wherein the second packet comprises the second address prefix and the identification information of the target flexible algorithm, so that the device in the first AS domain forwards, through a path corresponding to the target flexible algorithm, the packet that matches the second address prefix.

2. The network device according to claim 1, wherein the one or more processors are further configured to execute the instructions to cause the network device to:
   determine a first correspondence based on the first address prefix, wherein the first correspondence comprises a correspondence between the second address prefix and first identification information of a first candidate flexible algorithm.

3. The network device according to claim 2, wherein the one or more processors are further configured to execute the instructions to cause the network device to:
   use the first candidate flexible algorithm as the target flexible algorithm.

4. The network device according to claim 2, wherein the first packet further comprises second identification information of a second candidate flexible algorithm, and wherein the one or more processors are further configured to execute the instructions to cause the network device to:

determine the target flexible algorithm from the first candidate flexible algorithm and the second candidate flexible algorithm.

5. The network device according to claim 4, wherein the second identification information of the second candidate flexible algorithm is carried in a type-length-value (TLV) of the first packet, and a second path corresponding to the second candidate flexible algorithm is used to send the packet to the second device in the second AS domain.

6. The network device according to claim 1, wherein the second address prefix is in a segment routing internet protocol version 6 (SRv6) locator, the second packet comprises a locator TLV, and the locator TLV comprises the second address prefix and the identification information of the target flexible algorithm.

7. The network device according to claim 1, wherein the first address prefix matches the second address prefix.

8. The network device according to claim 1, wherein the first packet is a border gateway protocol (BGP) packet.

9. A network device, applied to a third device which is a border device in a second autonomous system (AS) domain, the network device comprises:
one or more memories configured to store instructions; and
one or more processors coupled to the one or more memories and configured to execute the instructions to cause the network device to:
send a first packet to a first device in a first AS domain, wherein the first packet comprises a first address prefix and identification information of a flexible algorithm, so that the first device in the first AS domain forwards a packet through a path corresponding to the flexible algorithm, and the packet matches the first address prefix,
wherein the first AS domain is different from the second AS domain, the first address prefix identifies a second device in the second AS domain, and a packet forwarding path corresponding to the flexible algorithm is used to forward the packet to the second device in the second AS domain.

10. The network device according to claim 9, wherein the second device is different from the third device, and wherein the one or more processors are further configured to execute the instructions to cause the network device to:
before sending, by the third device, the first packet to the first device in the first AS domain:
receive a third packet, wherein the third packet comprises an address prefix advertised by the second device and the identification information of the flexible algorithm, and the first address prefix is obtained based on the address prefix advertised by the second device.

11. The network device according to claim 10, wherein the third packet comprises a locator type-length-value (TLV), and the locator TLV comprises the address prefix advertised by the second device and the identification information of the flexible algorithm.

12. The network device according to claim 11, wherein the address prefix advertised by the second device is different from the first address prefix.

13. The network device according to claim 11, wherein the second device is the same as the third device.

14. The network device according to claim 9, wherein the first packet is a border gateway protocol (BGP) packet.

15. The network device according to claim 9, wherein the identification information of the flexible algorithm is carried in a TLV of the first packet.

16. A network system comprising:
a first device and a third device,
wherein the third device is a border device in a second autonomous system (AS) domain, and the third device is configured to:
send a first packet to the first device in a first AS domain, wherein the first packet comprises a first address prefix and identification information of a flexible algorithm, so that the first device in the first AS domain forwards a packet through a path corresponding to the flexible algorithm, and the packet matches the first address prefix,
wherein the first AS domain is different from the second AS domain, the first address prefix identifies a second device in the second AS domain, and a packet forwarding path corresponding to the flexible algorithm is used to forward the packet to the second device in the second AS domain;
wherein the first device is a border device in the first AS domain, and the first device is configured to:
receive the first packet, wherein the first packet comprises the first address prefix, the first address prefix is obtained based on an address prefix advertised by the second device in the second AS domain, and the first address prefix is used to send the packet to the second device;
obtain a second address prefix and identification information of a target flexible algorithm based on the first address prefix, wherein the second address prefix is used to send the packet to the second device; and
send a second packet to a device in the first AS domain, wherein the second packet comprises the second address prefix and the identification information of the target flexible algorithm, so that the device in the first AS domain forwards, through a path corresponding to the target flexible algorithm, the packet that matches the second address prefix.

17. The network system according to claim 16, wherein the first device is further configured to:
determine a first correspondence based on the first address prefix, wherein the first correspondence comprises a correspondence between the second address prefix and first identification information of a first candidate flexible algorithm.

18. The network system according to claim 17, wherein the first device is further configured to:
use the first candidate flexible algorithm as the target flexible algorithm.

19. The network system according to claim 17, wherein the first packet further comprises second identification information of a second candidate flexible algorithm, and wherein the first device is further configured to:
determine the target flexible algorithm from the first candidate flexible algorithm and the second candidate flexible algorithm.

20. The network system according to claim 19, wherein the second identification information of the second candidate flexible algorithm is carried in a type-length-value (TLV) of the first packet, and a second path corresponding to the second candidate flexible algorithm is used to send the packet to the second device in the second AS domain.

* * * * *